(12) United States Patent
Forler

(10) Patent No.: US 7,222,353 B1
(45) Date of Patent: May 22, 2007

(54) PROGRAM SIGNAL BLOCKING SYSTEM

(75) Inventor: Joseph Wayne Forler, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 09/581,753

(22) PCT Filed: Dec. 18, 1997

(86) PCT No.: PCT/US97/23838

§ 371 (c)(1),
(2), (4) Date: Oct. 24, 2000

(87) PCT Pub. No.: WO99/31882

PCT Pub. Date: Jun. 24, 1999

(51) Int. Cl.
*H04N 7/16* (2006.01)
*H04N 5/455* (2006.01)

(52) U.S. Cl. .................. 725/27; 725/38; 348/552; 348/553

(58) Field of Classification Search .............. 725/25, 725/38, 27, 28, 32; 348/563, 564, 565, 569, 348/588, 589, 552, 553
See application file for complete search history.

(56) References Cited

U.S. PATENT DOCUMENTS 5,535,275 A * 7/1996 Sugisaki et al. ............ 380/203
5,550,575 A    8/1996 West et al.
5,828,402 A * 10/1998 Collings ..................... 725/28
5,995,160 A * 11/1999 Rumreich .................... 348/564
6,055,023 A *  4/2000 Rumreich et al. ........... 348/553
6,088,064 A *  7/2000 Rumreich et al. ........... 348/564
6,097,442 A *  8/2000 Rumreich et al. ........... 348/563
6,115,057 A *  9/2000 Kwoh et al. ................ 725/28
6,181,364 B1* 1/2001 Ford ............................ 725/32

FOREIGN PATENT DOCUMENTS

EP        777385      6/1997
WO       97/23996     7/1997
WO       97/42759    11/1997

* cited by examiner

*Primary Examiner*—Kieu-Oanh Bui
(74) *Attorney, Agent, or Firm*—Joseph J. Laks; Robert D. Shedd

(57) ABSTRACT

An apparatus and a method for preventing a user from bypassing a viewer blocking system that uses program related information, such as content ratings, included in a program signal. The present invention prevents the user from exploiting the time delay associated with detecting, decoding and comparing the program related information by switching channels to observe portions of objectionable programs before the blocking system can react. The present apparatus comprises a processor (110) which provides an output signal (RGB OUT) derived from a selected program signal (VIDEO, VIDEO IN, AUDIO IN) of a selected signal channel and prevents or allows user access to the output signal in response to a determination of whether a user selected program blocking criteria is met. The processor modifies the output of a selected program signal upon user selection of a new signal channel if a default blocking mode is selected by the user, then continues to modify the program signal associated with the newly selected signal channel at least until the program related information is determined.

11 Claims, 3 Drawing Sheets

PROGRAM SIGNAL BLOCKING SYSTEM

The present invention relates to a system for processing and outputting a program signal, such as a television or a radio program signal, and more particularly to a system for processing and outputting a program signal in accordance with auxiliary information included with the program signal.

In addition to the video and/or audio program portions of a particular television or radio program, program signals may include auxiliary information. The program and auxiliary information may comprise analog and/or digital signals. An analog signal, such as an NTSC standard television signal, may include auxiliary data during horizontal line intervals within the vertical blanking interval (VBI). For example, closed caption data is included in line 21, field 1 of the VBI and Extended Data Services (XDS) information is included in line 21, field 2 of the VBI. In digital systems, the video signals are usually transmitted in packets, or groups, of data words. Each packet includes identifying information and represents a particular type of information such as video, audio or auxiliary information. An example of a digital television system that processes a packetized digital television signal is the DSS® (Digital Satellite System) receiver manufactured by Thomson Consumer Electronics, Inc., of Indianapolis, Ind.

One application of auxiliary information relates to the so-called "V-chip" technology which allows users to automatically block out objectionable material from their television receivers. In systems utilizing this technology, program related information included with program signals provide advisory information about the respective programs. The program advisory information may take several forms, including, but not limited to program ratings that indicate recommended viewer age and/or content ratings that indicate the presence and/or level of objectionable material, such as sex, violence, language, etc., in the program. For example, a proposed program rating system is described in proposed EIA-744 specification entitled, "Transport of Content Advisory Information using Extended Data Service (XDS)."

The V-chip technology examines the program advisory information associated with each selected program signal against a user selected blocking criteria, such as a selected rating blocking level, and blocks out the program signal if the program advisory information meets the user selected blocking criteria For example, if the blocking level is set at "PG", all programs with a rating of "PG" and higher, such as "R", "NC-17" and "X", would be blocked. Blocking the program signal refers to preventing user access to an objectionable program by, for example, rendering the video black or otherwise indecipherable, muting the audio and disabling the display of program related closed caption. When the program advisory information indicates that objectionable material is no longer being received, the V-chip system unblocks the program channel by displaying the video, unmuting the audio and/or enabling the display of program related closed caption. Examples of known systems for controlling access to program information are disclosed in WO 97/42759, EP0777385A2, and U.S. Pat. No. 5,550,575.

The V-chip technology described above differs from previous channel blocking-methods wherein a user was able to designate certain television channels to be continuously blocked unless overridden, for example, by entering a valid override code. In contrast to a V-chip system, such methods depend entirely on user designation of channels to be blocked rather than on program related information included in the program signal.

One difficulty associated with the V-chip technology described above is the delay time required for a television receiver to receive and decode program related information included with a program signal. Since program related information is transmitted periodically, in between video, audio and other information, a television receiver may experience a delay before receiving and decoding new program related information when a user selects a new channel. For example, the proposed ANSI/EIA-608A technical specification for the transmission of XDS Program Rating packet states that the Program Rating packet should be repeated at intervals no greater than 3 seconds unless delayed by closed caption data. Closed caption data always takes priority as required by law. So if field 2 captions are present, Program Rating packet transmissions may be delayed longer than 3 seconds. Therefore, when a user selects a new channel, the television receiver may take several seconds to detect and decode the new program related information and take appropriate blocking action. The delay is a noticeable period during which a possibly objectionable program remains unblocked and may be accessed by unintended audiences. As such, a user may be able to bypass the blocking feature and view and/or hear portions of an objectionable program when the television receiver is tuned to a new signal channel.

Therefore, what is needed is a system for preventing a user from bypassing the blocking feature in a system which uses program related information included with the program signal. In particular, what is needed is a system for preventing a user from exploiting the delay associated with detecting, decoding and examining program related information, in order to bypass the blocking feature.

The present invention overcomes the difficulties noted above by providing a system which prevents a user from exploiting the time delay noted above by providing a user selectable default signal blocking mode. The present invention is particularly suitable for use in signal output apparatuses that can tune to one of a plurality of signal channels and provide video and/or audio signal outputs. Such apparatuses include, but are not limited to, television receivers, digital satellite receivers, VCR's, video disk players and audio signal receivers.

The present system comprises a signal processor which provides an output signal associated with a program signal of a selected signal channel and controls user access to the program signal in response to a determination of whether program related information included in the program signal meets a user selected blocking criteria. User selected blocking criteria can take many forms including, but not limited to a particular rating blocking level, in which case the system prevents user access to the output signal if the received program related information equals or exceeds the user selected rating blocking level. Program related information may include, but is not limited to, recommended viewer age ratings, program content ratings, program title and program summary. Upon activation of a default signal blocking mode, the signal processor automatically controls the output signal associated with a newly selected channel to reduce user access to the program associated with the newly selected signal channel and thereafter continues such control at least until the processor determines whether the blocking criteria is met with respect to the program on the newly selected channel. Preferably, the signal processor continues such control of the output signal at least until the program related information is determined and compared with a user selected blocking level.

The output signal is controlled in a predetermined manner to reduce user access to the selected program signal. It is to be understood that controlling the output signal to reduce user access includes any processes or modifications to the program signal that render the program, or portions of the program visually and/or aurally incomprehensible to the user, including, but not limited to, interrupting the signal path, replacing the normal program signal with a blocking level, scrambling the output signal and/or replacing the normal program output signal with an On Screen Display (OSD) signal representing a displayed message indicating activation of the blocking feature. Such control methods advantageously result in, for example, blanking the video portion, muting the audio portion and disabling the closed captions associated with the program.

It can be seen that the present invention overcomes attempts to bypass the delay problem discussed above by automatically reducing access to a program signal associated with a new channel selection for a predetermined period whenever a default signal blocking mode is selected by a user.

The invention will be described with reference to the accompanying drawings, wherein.

Figure 1:
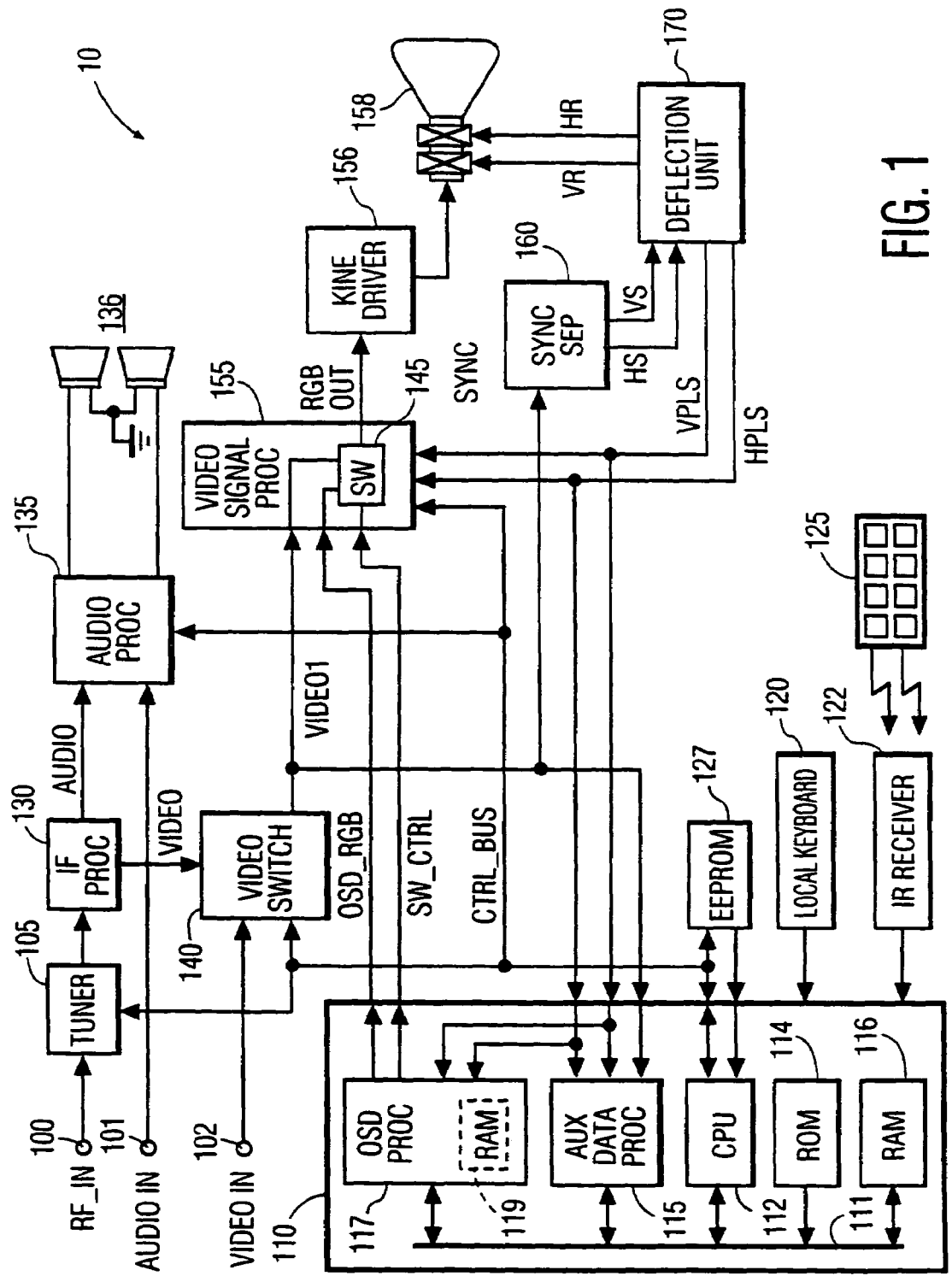
FIG. 1 is a block diagram of a television system embodying principles of the present invention.

An exemplary television receiver system 10 shown in FIG. 1 includes input terminal 100 which receives radio frequency (RF) television signals, e.g., from an antenna or cable, and applies the television signals to tuner assembly 105. Tuner assembly 105 selects and amplifies a particular RF signal associated with the selected television channel in response to control signals from controller 110. As used herein, the terms "controller", "control processor", "microprocessor" (or μP), and "microcomputer" (or μC) are equivalent and refer to devices which may or may not be in integrated circuit (IC) form and are capable of performing control functions.

As shown in FIG. 1, controller 110 includes central processing unit (CPU) 112, ROM 114 and RAM 116 interconnected via bus 111 and operating in a manner typical of microcomputers such as the ST9 integrated circuit (IC) manufactured by SGS Thomson, Inc. CPU 112 generates control signals to control the output of system 10 in response to software instructions stored in ROM 114 and EEPROM 127 and in response to user-provided command codes received through keyboard 120 and/or infra-red (IR) receiver 122. Controller 110 receives command codes from IR remote control 125 via IR receiver 122.

Control signals generated by controller 110 are provided to other components of system 10, such as tuner 105, via a control bus represented by the path labeled CTRL_BUS in FIG. 1. A typical implementation of the control bus shown in FIG. 1 includes, but is not limited to, a two-wire serial bus based on the Inter-Integrated Circuit (IIC or I2C) bus protocol supported by Philips.

IR remote control 125 and/or keyboard 120 permit a user to select a particular blocking criteria for automatically blocking objectionable material. The blocking criteria can take many forms including, but not limited to, blocking a program if an associated program related information, such as program ratings, equals or exceeds a user set information or ratings level. An example of an alternative blocking criteria is activating blocking in response to detecting a user-specified word or words in title or program description information included in the program related information. The user selected blocking criteria, which may be a ratings level as noted above, is stored in controller 110 and examined by CPU 112 to block or unblock a program as described further below. The user selection can be made, for example, by selecting a particular blocking mode and/or blocking level from an On Screen Display menu.

IR remote control 125 and/or keyboard 120 also permit a user to select a default signal blocking mode. If the user selects the default signal blocking mode, the system automatically controls an output signal to reduce user access whenever the user selects a new channel. It is to be understood that such manner of control includes any processes and modification to the program signal that render the program, or portions of the program visually and/or aurally incomprehensible to the user, including, but not limited to, interrupting the signal path, replacing the normal program signal with a blocking level, scrambling the output signal and/or replacing the normal program output signal with an On Screen Display (OSD) signal representing a displayed message indicating activation of the blocking feature. Such controls advantageously result in, for example, blanking the video portion, muting the audio portion, and disabling the closed captions associated with the program.

This manner of control is maintained at least until a program related information associated with the program signal on the newly selected signal channel is detected and examined to determine whether the user selected blocking criteria is met. The system then permits or maintains reduced user access to the program signal based on that determination. The operation of the present system under the default signal blocking mode is discussed in detail further below. The default signal blocking mode may be selected, for example, using an On Screen Display menu.

When a user selects a particular television channel by activating either keyboard 120 or remote control 125, controller 110 produces a control signal on bus CTRL_BUS which causes tuner 105 to tune to the RF signal of the selected channel. Tuner 105 outputs an intermediate frequency (IF) signal corresponding to the tuned channel to IF processor 130. IF processor 130 includes circuits such as, but not limited to, a video IF (VIF) amplifying stage, an AFT circuit, a video detector, and a sound IF (SIF) amplifying stage for processing the IF signal to produce baseband composite video signal VIDEO and sound carrier signal AUDIO. Audio signal processor 135 includes an audio detector and a stereo decoder that process signal AUDIO to produce a baseband audio signal suitable for driving speaker unit 136. Baseband composite video signal VIDEO from IF processor 130 is applied to video switch 140. Another video signal VIDEO IN may be provided to the present system by an external signal source, for example a VCR, via signal input 102. The external signal source may also provide an audio signal AUDIO IN via signal input 101. Controller 110 controls the respective outputs of video switch 140 and audio processor 135 in response to user selection of a particular signal source. It is to be understood that a plurality of external signal inputs may be provided to accommodate a plurality of external signal sources, and video signal switch 140 and audio processor 135 may be modified as necessary to allow user selection of a particular external signal source.

Depending on the user selection, video switch 140 provides signal VIDEO1, which is associated with one of the input signals, to video signal processor 155. Video signal processor 155 processes video signal VIDEO1 to produce red, green and blue (R, G and B) output signals RGB which are suitable for coupling to an image display device. Video signal processor 155 performs processing to provide, inter alia, automatic chroma and luma control and enable user-controlled features such as contrast and brightness control.

The RGB signals produced by video signal processor 155 are amplified to appropriately high voltage levels by kinescope driver amplifiers 156 before being coupled to kinescope 158 to display the desired image. The display on kinescope 158 is controlled by vertical and horizontal deflection signals VR and HR, respectively, that are coupled to deflection coils of kinescope 158. Deflection unit 170 produces signals HR and VR in response to horizontal and vertical sync signals HS and VS, respectively, that are separated from the synchronization component of output baseband signal VIDEO. Those parts of the system in FIG. 1 that have been described thus far are known, for example, from the CTC-197 color television chassis manufactured by Thomson Consumer Electronics, Indianapolis, Ind.

The system shown in FIG. 1 also includes an auxiliary data processor 115 for detecting and decoding various auxiliary information, including program related information, such as program ratings and/or content ratings, included with a video signal. Also, closed caption decoding functions may be included within auxiliary data processor 115 which is coupled with On Screen Display (OSD) processor 117 in order to insert closed caption information into the appropriate portions of the video display. Data processors for extracting auxiliary information from a video signal are conventionally known and typically include a data slicer, timing signal generators, control mechanisms, decoders and memory, among other things. Any one of a number of such conventionally known auxiliary data processors may be used in the present television system. For example, a system suitable for extracting auxiliary information from a video signal is disclosed in U.S. Pat. No. 5,561,469 entitled, "Auxiliary Video Data Slicer with Multi-Mode Peak Detection for Determining Sync and Data Slicing Levels."

Auxiliary data processor 115 detects and decodes program related information, such as program ratings, included in signal VIDEO1, and provides the program related information to CPU 112. CPU 112 examines the detected program related information and determines whether a user selected blocking criteria is met, for example, by comparing the detected program related information with a user selected blocking level and determining whether the detected program related information equals or exceeds the user selected blocking level.

If the user selected blocking criteria is met, CPU 112 renders the program inaccessible by controlling the output signal in a predetermined manner. It is to be understood that such manner of control includes any processes and modification to the program signal that render the program, or portions of the program visually and/or aurally incomprehensible to the user as noted above. For example, controller 110 provides control signals to disable the output of audio processor 135, disable closed caption output and replace the normal program signal with an appropriate OSD signal, such as a uniform blue screen including a message indicating activation of the blocking feature. If the detected program related information does not meet the user selected blocking criteria, CPU 112 allows video signal processor 155 and audio processor 135 to provide output signals associated with the received signals in the conventional manner.

Figure 2:
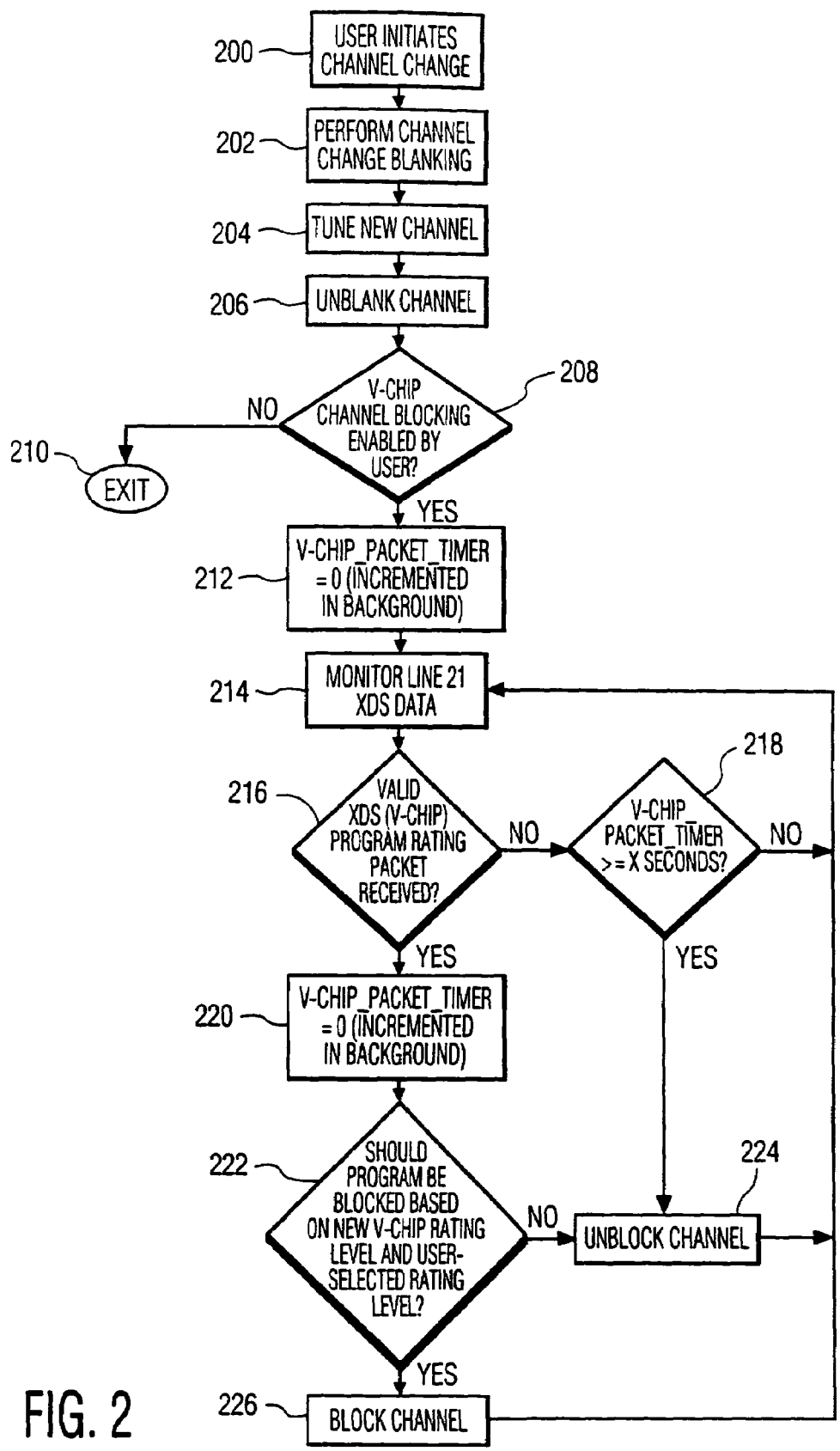
FIG. 2 is a flowchart showing the steps for changing a channel in a television system which does not provide a user selectable default signal blocking mode.

FIG. 2 is a flowchart showing the steps taken by a television system which does not provide a user selectable default signal blocking mode. When a user initiates a channel change in step 200, the television system performs a channel blanking in step 202, tunes to a newly selected channel in step 204, and then unblanks the television display in step 206. The channel change blanking of step 202 may be similar to the blocking performed by the V-chip system in that the program signal may be controlled in the manner described above to render the program signal inaccessible to the user. In this case, the newly selected channel is momentarily blanked while the channel is being tuned, but is immediately unblanked after tuner 105 tunes in the program signal associated with the new channel.

After the new channel has been tuned and unblanked, the television system determines whether the V-chip channel blocking feature is enabled in step 208. If not, the system exits from the program in step 210. If the blocking feature is enabled, the system sets a V-chip Packet Timer to zero and begins incrementing the timer in step 212. The television system then monitors line 21 XDS data for program related information in step 214.

Once a valid XDS program related information packet has been detected and decoded in step 216, the system resets the V-chip Packet Timer to zero and begins incrementing the timer in a predetermined manner in step 220. The system then compares the newly detected program related information with a user selected blocking level in step 222 to determine whether the user selected blocking criteria is met. If the blocking criteria is met, i.e., the newly detected program related information equals or exceeds the user selected blocking level, the system blocks user access to the channel in step 226 by controlling the output signal as described above, and returns to step 214 to repeat the process of detecting and comparing program related information and blocking/unblocking the channel as necessary. If the blocking criteria is not met, i.e., the newly detected program related information is less than the user selected blocking level in step 222, the system allows user access to the program associated with the newly selected channel and returns to step 214 to repeat the monitoring and blocking process as noted above.

Also, if the television system fails to detect a new program related information within a predetermined period of time as determined by the incrementing of the V-chip Packet Timer, the television system will allow user access to the channel, or maintain the channel unblocked, and return to step 214 to repeat the process as noted above. Therefore, the television system continually attempts to detect new program related information and determine whether a user selected blocking criteria is met to control user access to the received program signal.

However, it can be seen that user access to the channel occurs in step 206 prior to the detection of new program related information and determination of whether the blocking criteria is met when a user selects a new channel. As discussed above, a significant amount of time may elapse before new program related information is detected and processed, thereby possibly allowing unintended user access to objectionable material.

Figure 3:
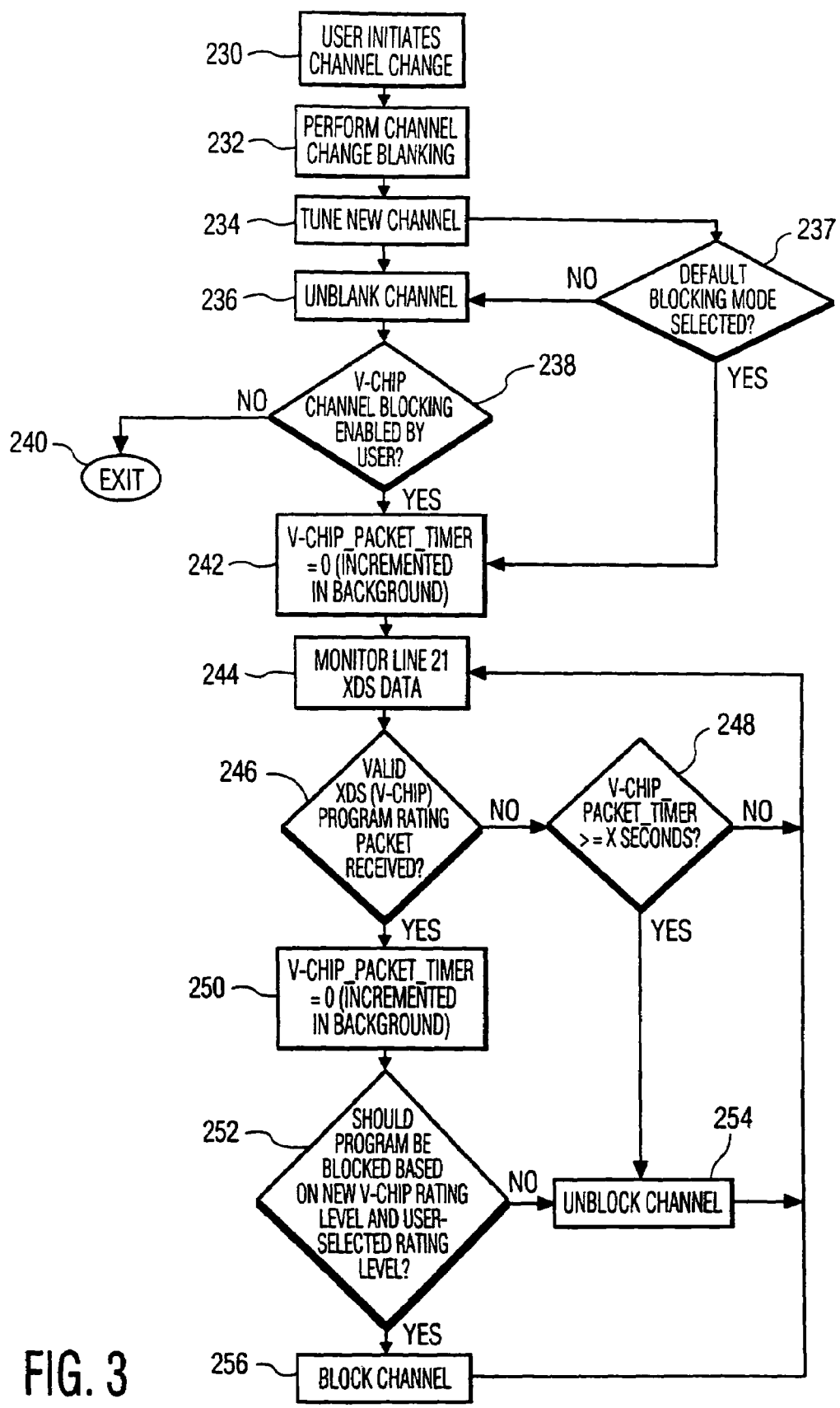
FIG. 3 is a flowchart showing the steps for changing a channel in a television system in accordance with the present invention which provides a user selectable default signal blocking mode.

FIG. 3 is a flowchart showing the steps performed by a system according to the present invention which provides a user selectable default signal blocking mode. Such a feature provides protection against a user's attempt to exploit the above-noted delay when the user changes channels. The steps described below may be programmed into controller 110 using any one of the conventionally known methods.

Again, when a user initiates a channel change in step 230, the present system performs a channel change blanking in step 232 and tunes in the new channel in step 234. However, after tuning in the new channel, and before unblanking the television display, the present system determines whether the default signal blocking mode has been selected by the user. If not, the system unblanks the channel in step 236 and proceeds through steps 238–256, which correspond to steps 208–226 in FIG. 2.

If the default signal blocking mode is selected, the present system maintains the newly selected channel blanked and proceeds to steps 242–256, which correspond to steps 212–226 in FIG. 2. Again, the present system seeks to detect program related information within a predetermined amount of time, then examine the detected program related information against a user selected program blocking criteria. If the program blocking criteria is met, i.e., the detected program related information equals or exceeds a user selected program blocking level, the system will prevent user access to the program signal in the manner discussed above. If the program blocking criteria is not met, the system will unblank the channel and permit user access to the program signal in the conventional manner.

It can be seen that selecting the default signal blocking mode provides protection against user attempts to bypass a program information based blocking system by viewing or listening to portions of an objectionable program when the television receiver is tuned to a new signal channel. By automatically blocking the program signal whenever a new signal channel is selected, the system prevents the user from accessing portions of a possibly objectionable program when a new signal channel is selected, and prevents access at least until the system is able to detect the new program related information associated with the newly selected signal channel and determine whether a user selected blocking criteria is met.

It will be apparent to those skilled in the art that although the invention has been described in terms of an exemplary embodiment, modifications and changes may be made to the disclosed embodiment without departing from the essence of the invention.

It is herein recognized that the channel blanking described above may be accomplished using any one of a number of conventionally known methods, or combination of methods, for example by using the normal channel change blanking mechanism already built into a signal receiver together with another blanking mechanism to provide additional blanking beyond the normal channel change blanking period, or by using the normal channel change blanking mechanism wherein the blanking period is extended as desired.

Also, the present series of steps shown in FIG. 3 may be implemented for a variety of signal formats wherein auxiliary information is included with program signals. The above-described system and method may be adapted for use with any signal receiving system which can tune to one of a plurality of signal channels and provide an output signal associated with the tuned signal channel. As such, the present invention may be adapted for use with, but is not limited to, televisions adapted for NTSC, PAL or SECAM signals, digital television receivers, such as digital satellite signal receivers and HDTV receivers, VCRs, and internet based audio/video program systems. Further, the above-described system may be used to provide default signal blocking whenever the user changes the signal input source from one source to another, for example, provide default blocking when the user switches from an internal tuner to an external signal source, such as a VCR.

Additionally, the present system may be modified such that the default signal blocking mode is applicable to all channels, or to only designated channels, as selected using an On Screen Display menu. The OSD menu, or portions of the OSD menu, may be password protected to prevent unauthorized access. The period of blocking, for example a designated maximum time period, may also be user selectable using an OSD menu.

The invention claimed is:

1. An apparatus, comprising:
a signal input for receiving a program signal associated with one of a plurality of signal channels, said signal input selecting one of said plurality of signal channels in response to a user input;
a signal output for providing an output signal derived from said program signal;
an auxiliary data decoder for detecting program related information included in each said program signal; and
a processor operatively connected to said signal input, said signal output and said auxiliary data decoder, wherein said processor is responsive to user selection of a first operating mode for controlling said output signal in a predetermined manner to reduce user access to said output signal for at least until said program related information is detected upon user selection of a new one of said plurality of signal channels and user selection of a second operating mode for providing user access to said output signals and prior to detection of said program related information.

2. The apparatus according to claim 1, further comprising a second signal input for providing a second program signal from a second signal source, and a switch for operatively coupling one of said signal input and second signal input to said signal output, said output signal being derived from one of said respective program signals, wherein said processor controls said output signal in said predetermined manner when the user selects one of said signal inputs for at least until said program related information is detected.

3. The apparatus according to claim 1, wherein said program signal is a television signal.

4. The apparatus according to claim 1, wherein said program signal comprises a plurality of digital signal packets.

5. The apparatus according to claim 1, wherein said program signal comprises a plurality of time-multiplexed digital signal packets.

6. The apparatus according to claim 1, wherein said predetermined manner of control comprises one of blanking the video signal, replacing the video signal with an On Screen Display message, muting the audio signal and disabling associated closed captions.

7. The apparatus according to claim 1, wherein said processor is responsive to user selection of a second operating mode for controlling said output signal in said predetermined manner for at least until said program related information is detected upon user selection of a new one of a plurality of user designated signal channels of said plurality of signal channels.

8. The apparatus according to claim 1, wherein said processor is capable of providing an On Screen Display menu for allowing user selection of said first operating mode.

9. The apparatus according to claim 8, wherein said processor is capable of providing a restricted access On Screen Display menu for allowing user selection of said first operating mode.

10. The apparatus according to claim 9, wherein access to said On Screen Display menu is password protected.

11. A method for selectively blanking a display comprising the steps of:
selecting a change of channel to be displayed;
blanking the display;
tuning to the selected channel;
determining whether a default blanking mode has been set;
if a default blanking mode is not set, unblank the display, otherwise retain display blanking;
determine whether authorization exists for displaying the selected channel;
if authorization for displaying the selected channel exists, display the selected channel, otherwise blank the display.

* * * * *